May 30, 1933.  C. W. RYERSON  1,911,849
TIRE COVER
Filed April 2, 1931  2 Sheets-Sheet 1

Inventor
Creighton W. Ryerson
By his Attorney

May 30, 1933.  C. W. RYERSON  1,911,849
TIRE COVER
Filed April 2, 1931  2 Sheets-Sheet 2
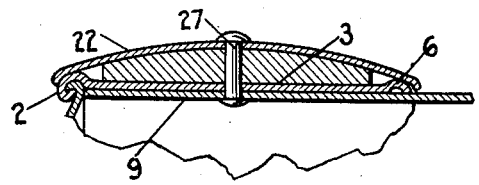
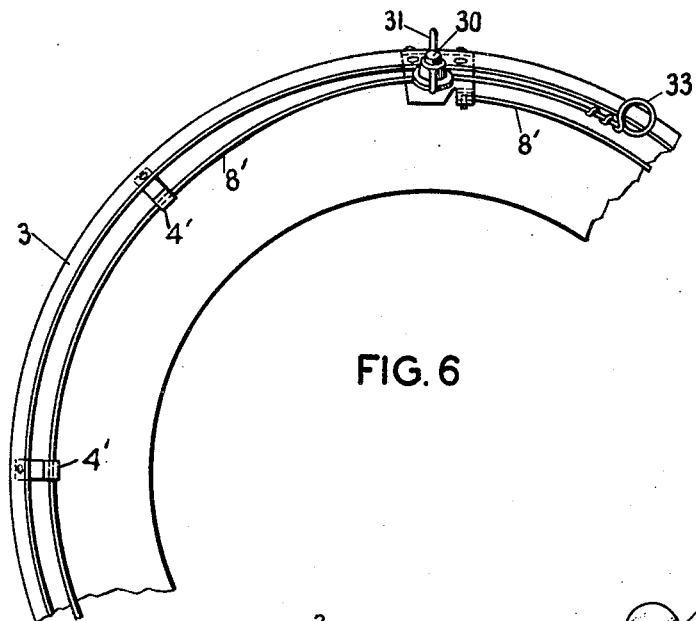
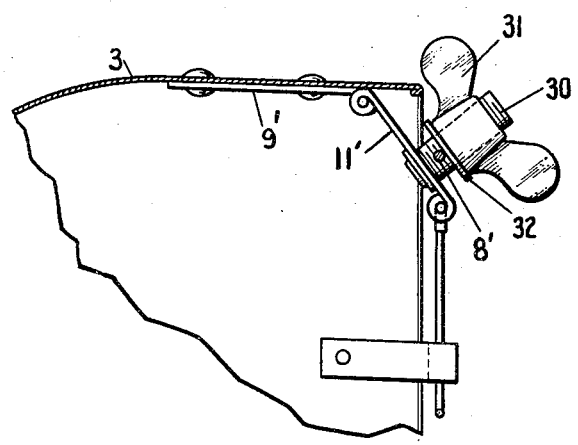
Inventor
Creighton W. Ryerson
By his Attorney Patented May 30, 1933

1,911,849

UNITED STATES PATENT OFFICE

CREIGHTON W. RYERSON, OF JACKSON, MICHIGAN, ASSIGNOR TO RYERSON & HAYNES, INC., A CORPORATION OF MICHIGAN

TIRE COVER

Application filed April 2, 1931. Serial No. 527,091.

This invention relates to tire covers of the kind described in my copending application Serial No. 455,009 filed May 22, 1930.

One of the objects of the invention is to construct a metal tire cover with a reinforcing band to furnish additional rigidity.

Another object is to produce a more attractive looking cover by means of a band that may be metal plated or painted to contrast or harmonize with the rest of the tire or with the autmobile on which the cover is to be used.

Another object of the invention is to simplify and lower the cost of production of the closing means for the tire cover.

Other objects will appear in the following description, reference being had to the drawings in which:

Fig. 5 is a section through the band and a portion of the adjacent parts of a portion of a modified cover arrangement.

Fig. 6 is a modification having spring grips or tabs in place of serrations with a screw clamp for holding the wire in place.

Fig. 7 is a view of a modified form of clip.

Figure 1:
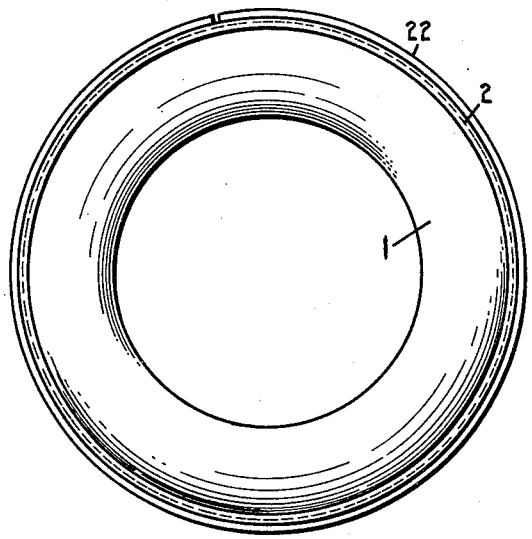
Fig. 1 is an elevation of the tire cover, the handle being omitted.

Referring to the drawings, the tire cover consists of a trough shaped ring 1 secured by an interlocking joint 2 or otherwise to an annular outer hoop portion 3 which has a series of serrations or fingers 4 on one edge as clearly shown in the figures. The part 1 may have its edge bent back in the form of a bead at 5 to prevent wear of the tire or injury to the hands of the operator and also to strengthen the disc. The annular portion 3 may have a bead 6 to give it additional strength. This bead is positioned adjacent to the serrations 4 which may have rounded openings 7 at the bottom of the notch separating the serrations. The serrations 4 have their ends bent over to form channels to receive the expanding and contracting wire to be later referred to.

A stiffening plate 9 is riveted, welded or otherwise fastened beneath the annular member 3. This plate has an extension 11 projecting outwardly to the serrated edge 4 of the member or band 3. A portion of this extension 12 is bent over to form a channel to receive the wire 8 and the remainder is bent at right angles to form an ear 13.

Between the ears 13 and 14 is pivoted an operating handle 15 having a finger piece 15' and a binding post 17 spaced between the pivoted point and the finger piece. This binding post consists of a headed bolt 16 which passes through the flattened portion of the handle 15. A hole in this bolt is adapted to receive the end 18 of the tightening wire. On screwing down the nut 19 the washer 20 clamps the wire in the hole in the binding post.

The end 21 of the tightening wire 8 passes through holes in the ears 13 and 14 and is riveted therein by swaging the wire on each side of the ears. This end of the wire acts as a pivot point for the lever 15.

Figure 2:
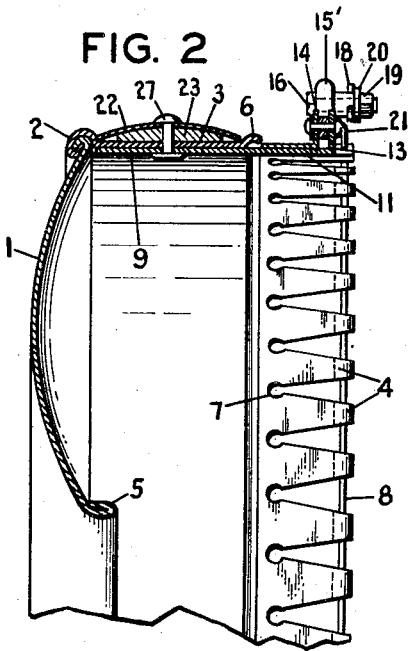
Fig. 2 is a section through the cover taken on the irregular line 2—2 of Fig. 3.

A strengthening hoop or band 22 is fitted between the seam and the bead 6 of the band 3, it being open ended for this purpose, as shown in Fig. 2. In the modification of Fig. 5, the strengthening band 22 extends outside the seam 2 and bead 6. In this modification the band hides the bead and seam and exposes the hoop to view from the rear. To secure the hoop 22 tightly in place I spot weld, rivet or otherwise form a tongue 23 to the end 24. This tongue 23 is fastened on the under side of the end 24 and projects under the other end 25. To tightly grip the band 22 in place on the tire cover I provide two holes 26 therein to receive the prongs of a spanner or tightening tool. On moving these prongs together by sufficient application of power the ends 24 and 25 are brought closer together and the band tightly grips the annular member 3. A hole is then drilled or otherwise formed through the end 25 the tongue 23 there beneath the annular member 3 and the plate 9. The parts are then held in position by a rivet or other suitable fastener 27.

I may of course form the holes for the rivet in the separate parts before the hoop is applied to the member 3 but I prefer to make this rivet hole at least through the parts 23, 3 and 9 after the hoop 22 is clamped in position as this ensures that it will always be tightly positioned on the member 3.

Figure 4:
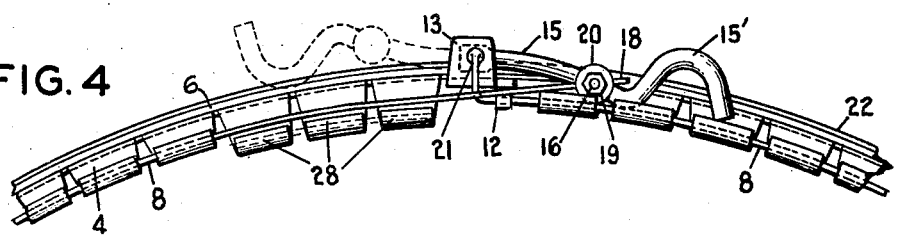
Fig. 4 is an elevation of the upper part of the cover shown in Fig. 2 with the tightening lever in closed position.

To place the tire cover in position on a spare tire the finger piece 15' is grasped and the handle 15 rotated to the position shown in dotted lines in Fig. 4, the binding post 16 turning in the handle during this operation. This movement forces the wire 8 through the channels in the serrations 4 around the circumference of the cover and expands them so that the cover can be readily passed over the spare tire. The wire may not pass through a few of the serrations such as 28 to permit the wire 8 more readily to perform this expanding movement. These serrations, however, are quite flexible like the others and they offer no impediment to the placing of the cover on the tire. It is also permissible to leave this portion of the cover in solid form, that is unserrated.

The handle 15 is then rotated in the opposite direction to the position shown in Fig. 4. This movement of the handle draws the wire 8 through the serrations 4 and forces them tightly down against the side of the tire. This holds the tire cover firmly in place.

As a further modification I have omitted the tongue portion 23. One then drills an additional hole through the hoop 22, the annular member 3 and the strengthening plate 9, after the band is drawn tightly in position as already described, and fastens a second rivet 27' therein.

Instead of using rivets 27 and 27' I may spot-weld the ends 24 and 25 in place or otherwise fasten them lightly in place on the cover.

Instead of placing the hoop in position between the beads 2 and 6, I may construct it to overlap the same as shown in Fig. 5. In Figs. 6 and 7 I have shown a further modified form of positioning means. I have secured spring clips 4' at spaced intervals around the member 3 for example at intervals of 45° and secured inside against the inner surface of band member 3. With this form of clamping means the clips will expand to open position through their own resiliency when the draw member is released. The draw member 8' in this case need not be a spring wire but may be an ordinary soft wire or even a stranded cable or a cord. In this modification I have shown a different clamping means but by way of example only.

The wire 8' passes through a stud 30 in a hole therein and the thumb nut 31 clamps the washer 32 down upon the draw member 8' to hold it in place. This stud is secured to the plate 11' which is hinged to the plate 9'. On pulling on the ring end 33 the spring clips are drawn down on the tire and the cover is rigidly held on the tire. The wing nut on being screwed down holds this adjustment. On loosening the wing nut the spring clips spring outward and draw the member 8' or tend to draw it, back through the clamping stud 30 so the tire can be removed. In case the member 8' is a wire this movement may be aided by pushing on the ring 33 to permit the clips to expand. Also if the friction of the member 8' in the clips retards the expansion of these clips, an outward pull on the tire to remove it will aid in retracting the draw member.

Figure 3:
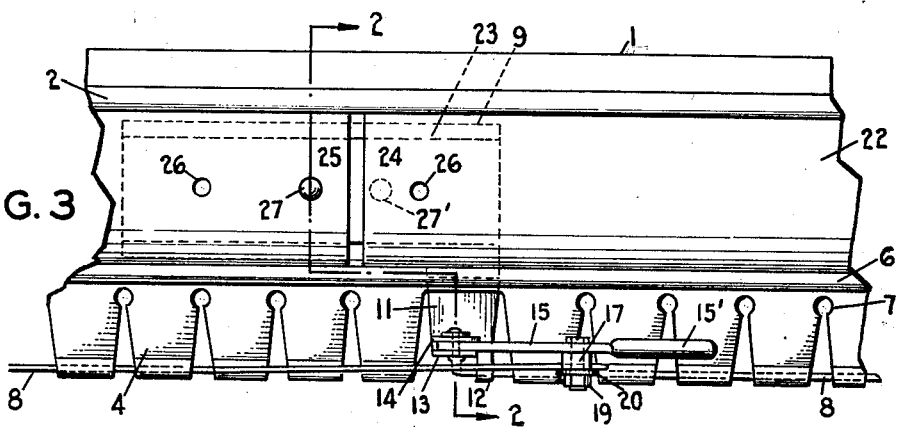
Fig. 3 is a plan view of a portion of the upper part of the cover shown in Fig. 2.

The fastener 30, 31 may also be used in the construction shown in Figs. 2 to 4 inclusive.

An advantage of my metallic tire cover is that it furnishes a stronger cover than the usual fabric cover, is free from the usual wrinkles of a fabric cover and may be metal plated, painted or otherwise decorated to harmonize or contrast with the finish of the automobile. The strengthening hoop 22 may be painted or metal plated differently from the remaining part of the tire cover in some cases and the use of this extra reinforcing hoop makes it easy to produce this contrast, particularly in case of metal plating. In such case the hoop 22 may be plated entirely separately from the other parts.

Instead of making the strips 4' in the form of springs I may make them like the members 11', 9' of Fig. 7 that is, the strips 4' may be hinged to the cover. In this case it would be necessary to use a stiff wire 8' to spread the hinged strips in opening the covers.

Having described my invention, what I claim is:

1. In tire covers, an annular band adapted to surround a spare tire, fingers spaced around and substantially housed inside the band, a draw member passing through the free ends of said fingers and means to contract the draw member and hold it in contracted position to move and hold the fingers against the tire.

2. In tire covers, an annular band adapted to surround a spare tire, spring fingers spaced around the band and substantially housed inside, said fingers being biased radially outwards to lie against the inner surface of the band, a draw member passing through the free ends of said fingers and means to contract the draw member and hold it in contracted position to move and hold the fingers against the tire.

3. In tire covers, an annular band adapted to surround a spare tire, spaced gripping members substantially housed inside said band and a wire passing through the ends of said members adapted to move them against the tire to hold the cover thereon.

In testimony whereof, I have signed my name to this specification this 30 day of March, 1931.

CREIGHTON W. RYERSON.